Oct. 21, 1947.  G. A. DUNN  2,429,346
FEEDING MEANS FOR PEAR PEELING MACHINES
Filed Oct. 20, 1942  8 Sheets-Sheet 8

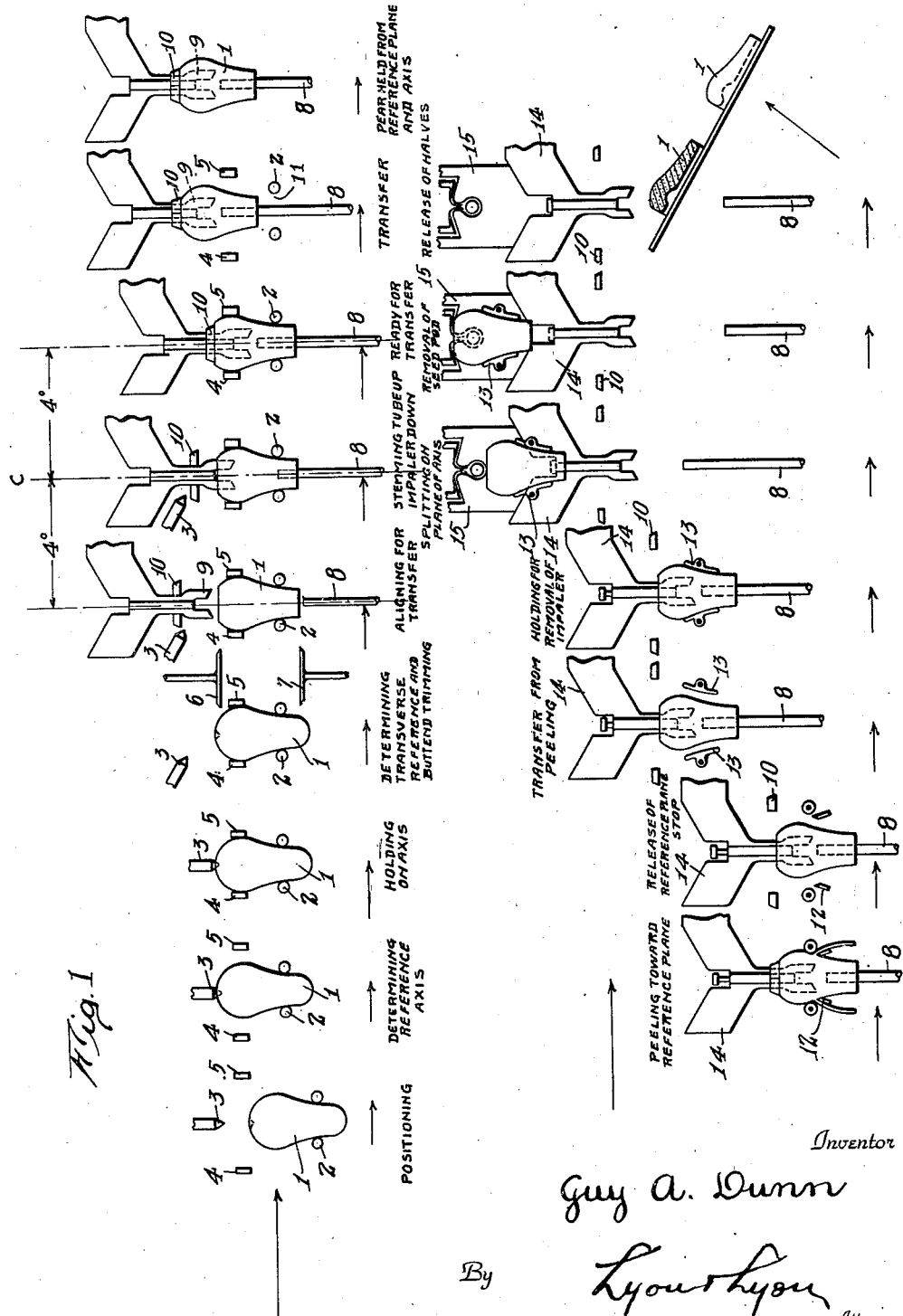

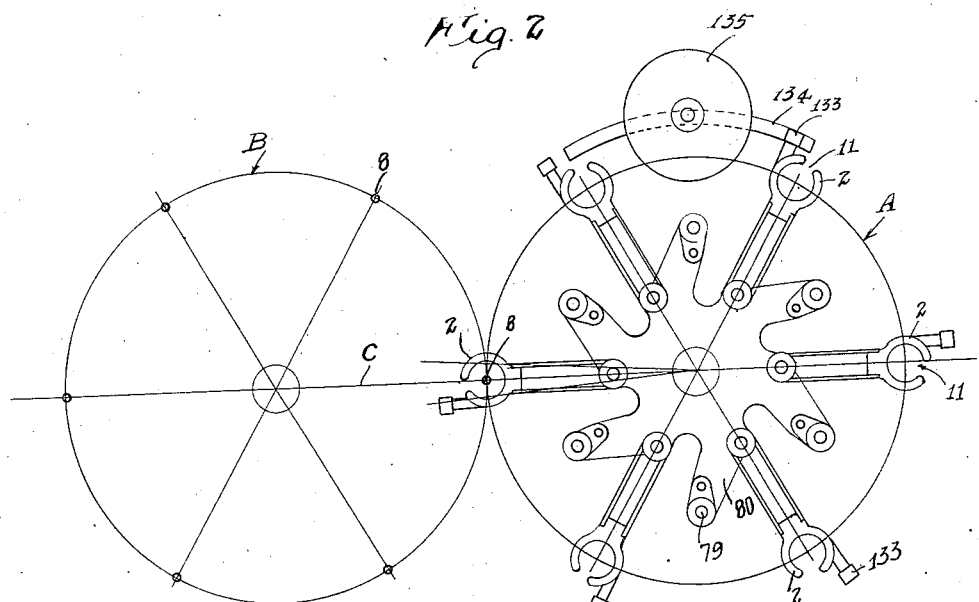
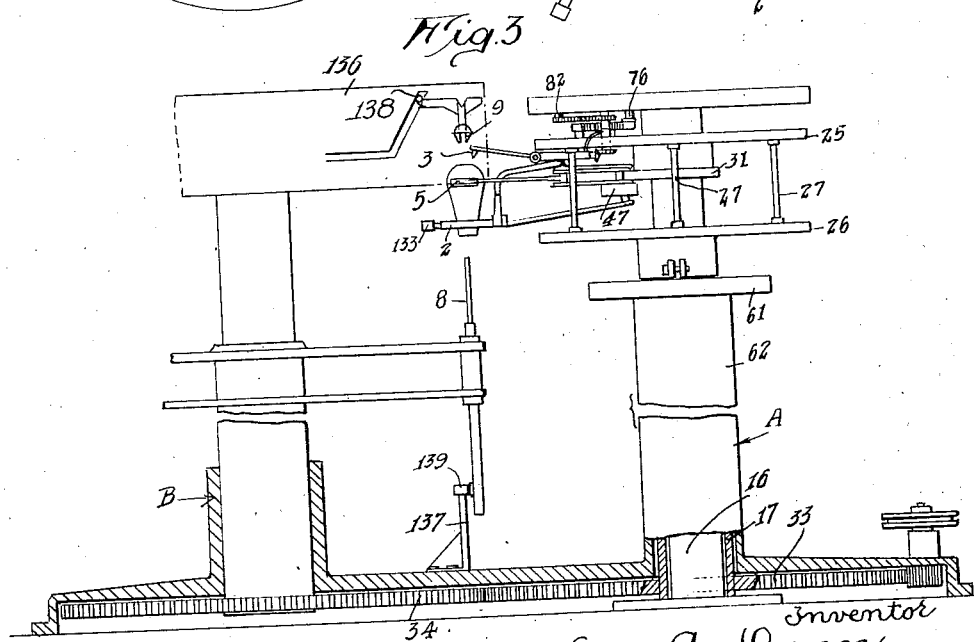

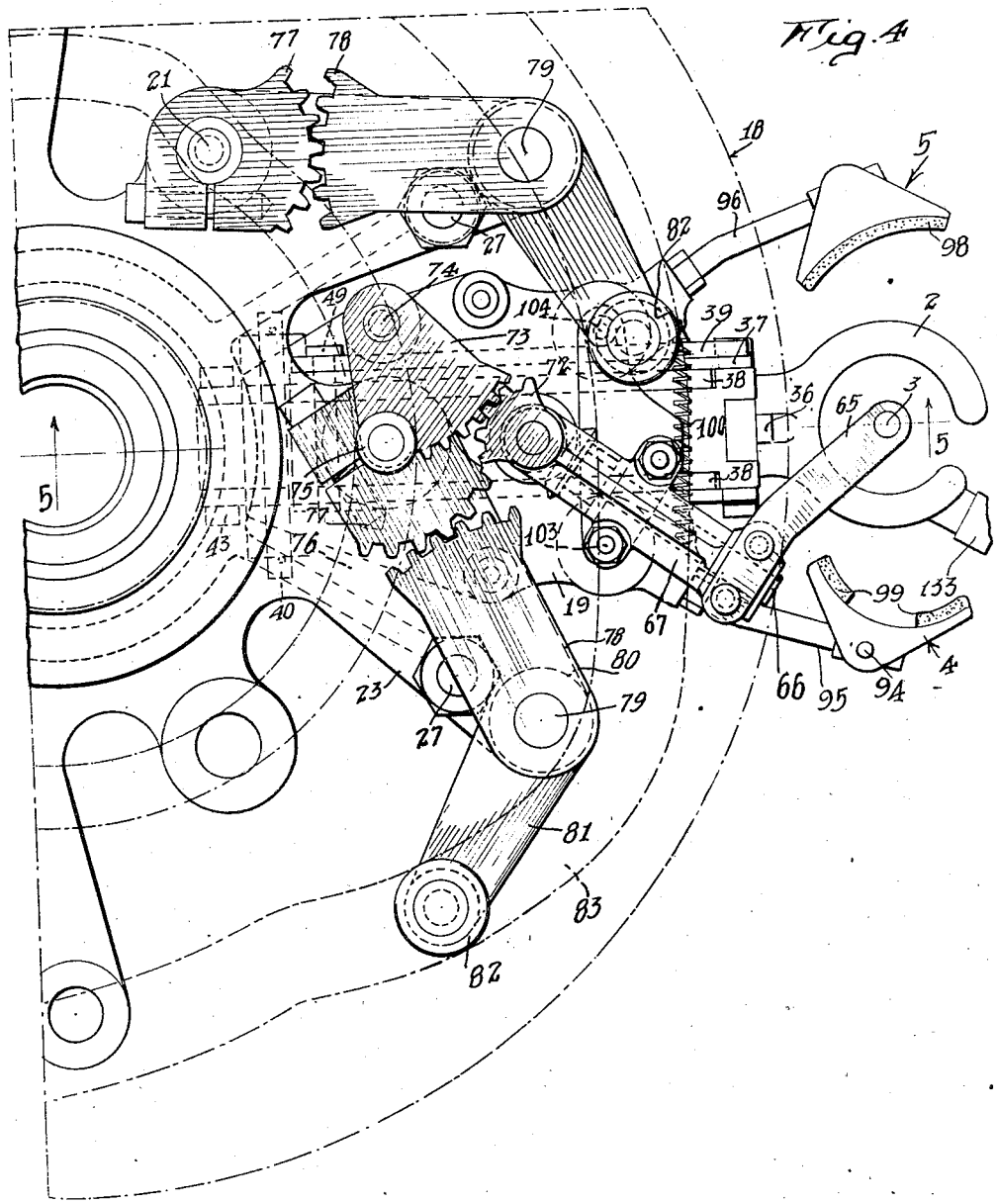

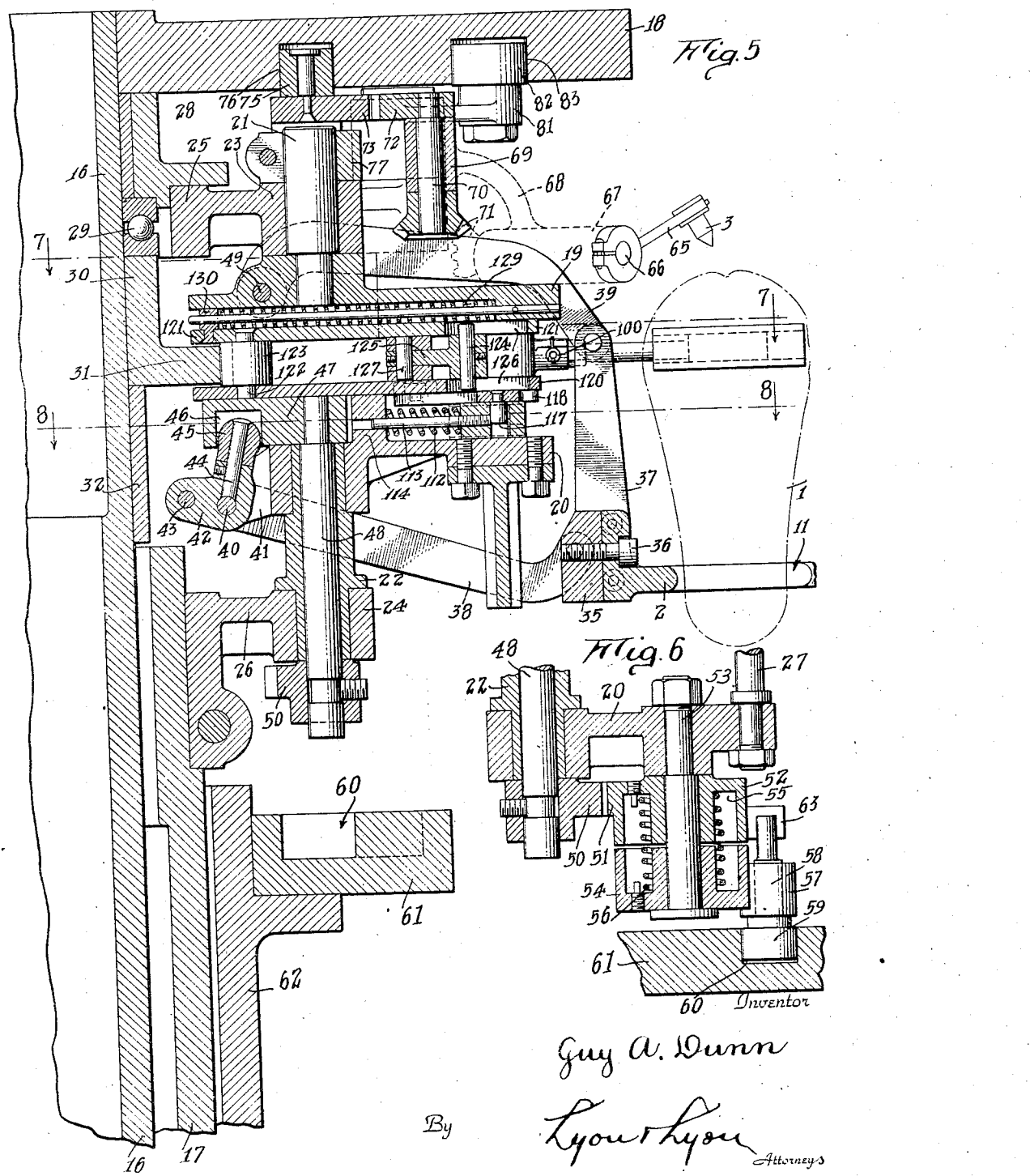

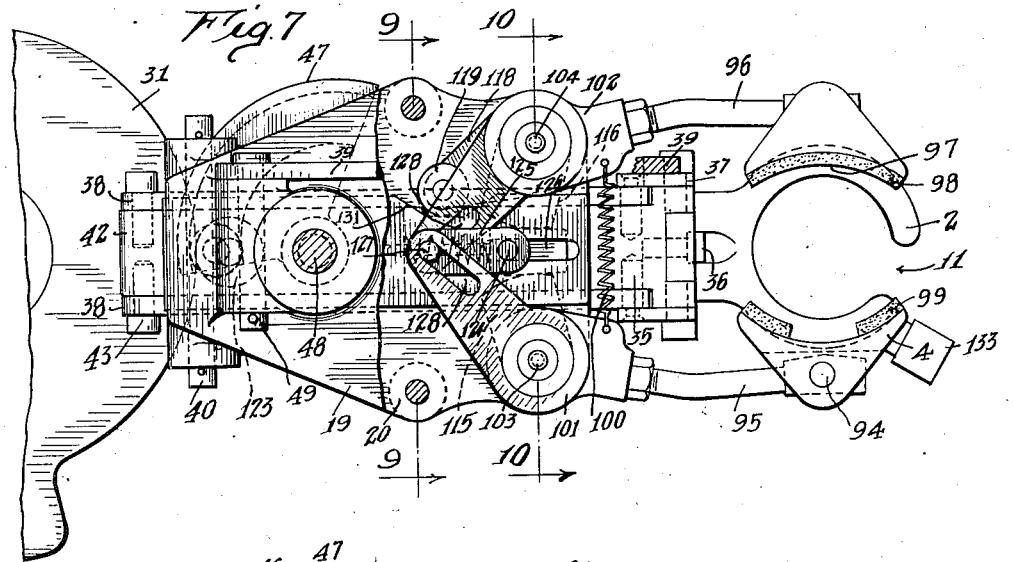
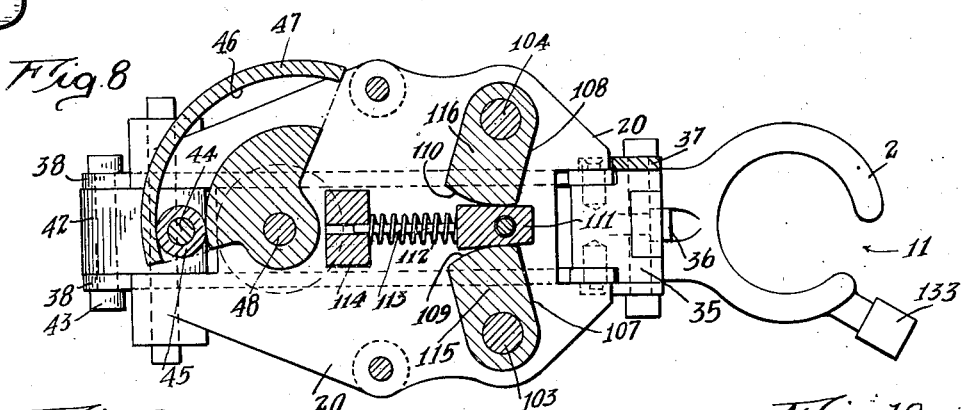
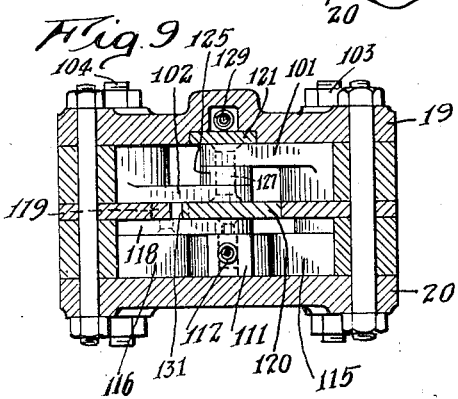
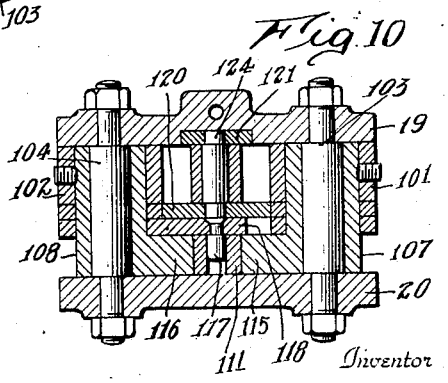

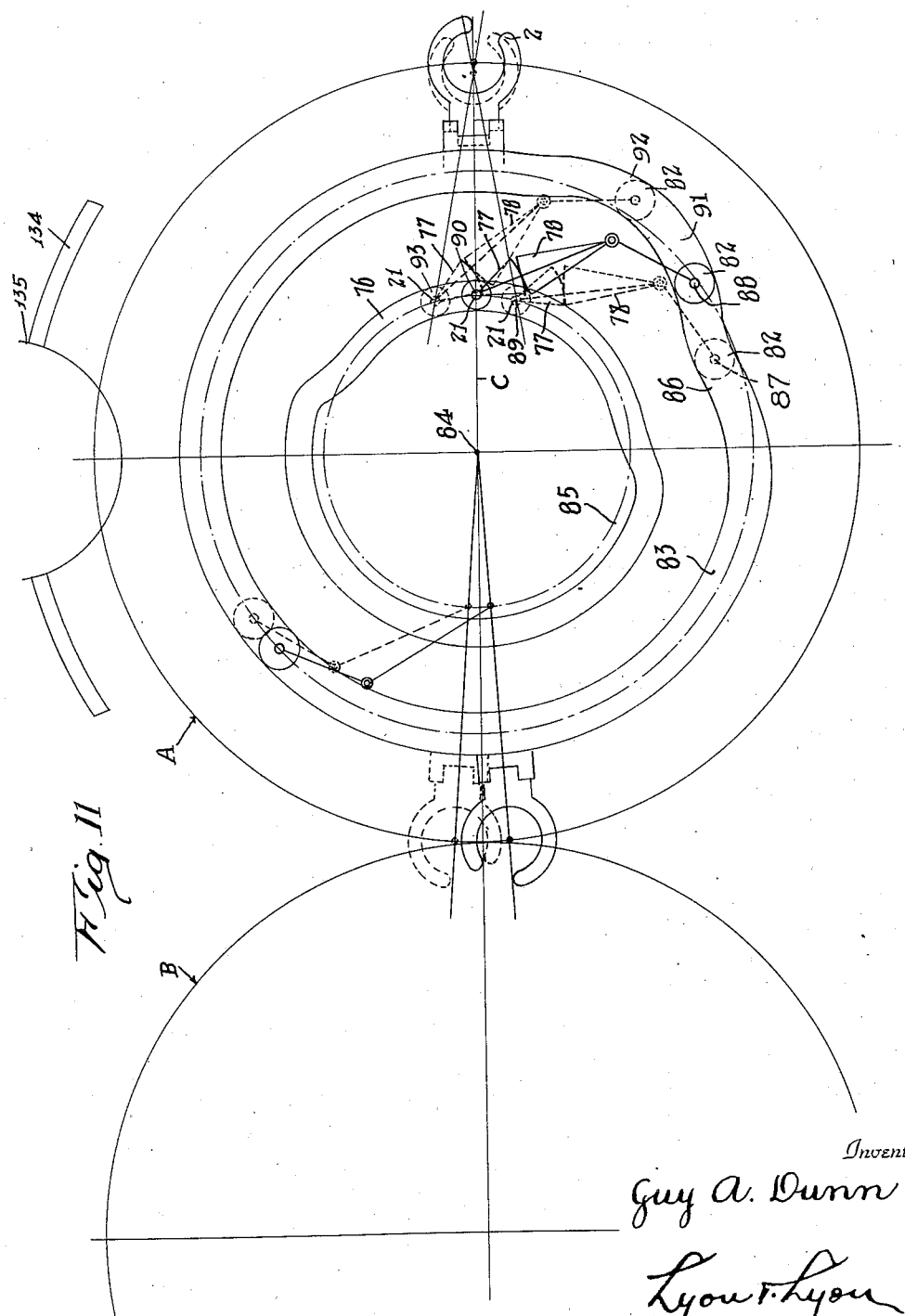

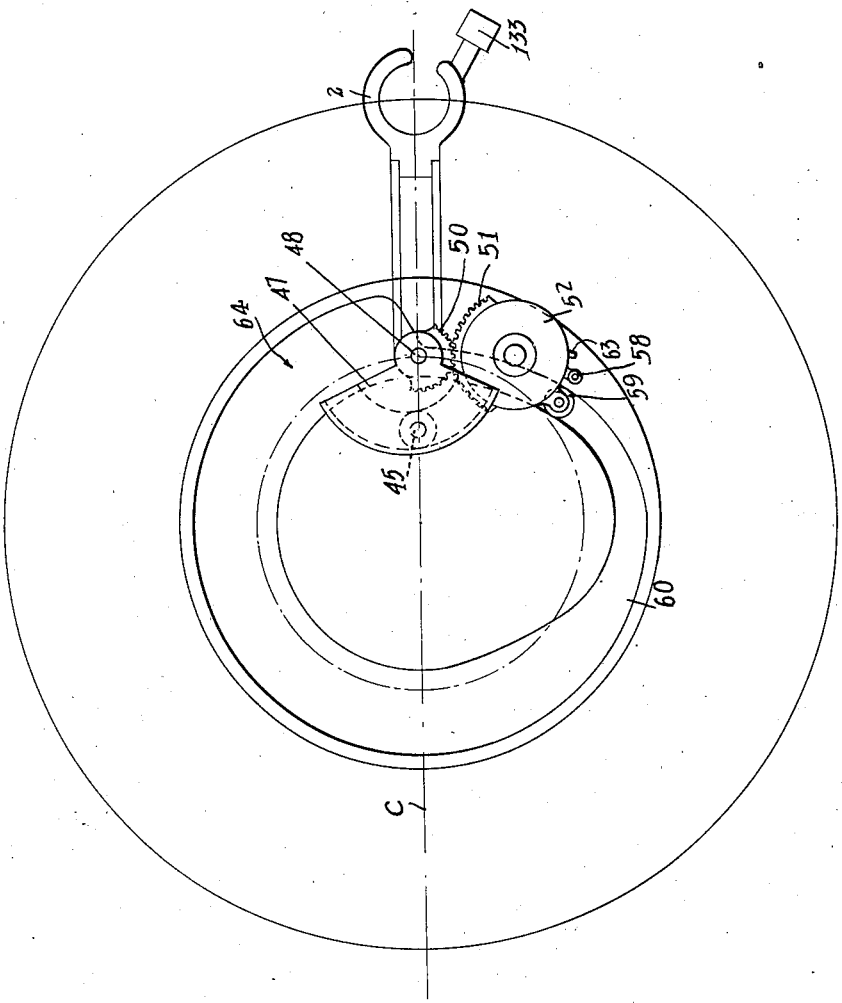

Inventor
Guy A. Dunn
By Lyon & Lyon
Attorneys

Patented Oct. 21, 1947

2,429,346

UNITED STATES PATENT OFFICE 2,429,346

FEEDING MEANS FOR PEAR PEELING MACHINES

Guy A. Dunn, Oakland, Calif., assignor to California Packing Corporation, San Francisco, Calif., a corporation of New York Application October 20, 1942, Serial No. 462,699

10 Claims. (Cl. 146—51)

This invention relates to a pear preparation method and means and is more particularly directed to a continuous method and means for preparing pears for canning or other uses.

In the preparation of pears for canning it is necessary to peel, core, stem and shape the pears when in the correct condition of ripeness for canning and these operations must be carried out in such manner as to avoid loss of fruit. A method and apparatus for so preparing pears for canning is developed as a substitute for hand methods of such preparation and which hand methods have heretofore been used. There has also been developed machines for so preparing pears for canning which are of the intermittent type, that is, where the operations of feeding, peeling and the like are intermittently carried out or related.

It is evident that for a method and apparatus to obtain high capacity and speed of operation that it should be of the continuous type, that is, where the pear is continuously entered into the method to carry continuously through the respective operations to the production of the peeled halves which are properly stemmed, cored and shaped.

In the development of such a continuous method and means, it has been found advisable to employ a feed mechanism or turret into which the pear may be properly positioned and an operating turret in which the operations of peeling, coring and stemming are performed. I have discovered that the feed, transfer and operations may be performed continuously upon the pear where the pear is positioned in a feed mechanism or turret in such manner as to provide definite points of reference upon the pear and that the pear when so positioned and in which the reference points have been established may be continuously transferred into the operating turret and may be gripped along its axis when passing from the feed turret to the operating turret with both turrets in continuous operation, and wherein the pear in passing between the turrets is transferred during the period of time when the holding means of the feed turret and the axial gripping means of the operating turret are passing along arcs of circles which are substantially tangent.

I have found that the transfer from the feed to the operating turret may be effected where the pear is gripped along an axis running lengthwise of the pear while still maintaining the correct position of the pear, avoiding the use of complicated transfer mechanisms by carrying out the transfer while the paths of movement of the feed and operating turrets are substantially tangent and where the deviation from tangency does not exceed the limitation of accuracy possible in the handling of such fruit.

I have found that such a transfer may be effected in fruit such as a pear substantially at the point of tangency of the circles of rotation of the feed and operating turrets by impaling the pear along a reference axis because the pear or fruit being transferred is not of such rigid construction as to prevent its yielding as required in order to compensate for the small increment of misalignment necessarily encountered in such a transfer.

It is therefore an object of this invention to provide a method of handling pears which includes feeding the pears, positioning the pears so fed as to define an axis therethrough substantially coincident with the stem of the pear and the transferring such pear into an operating cycle where the pear is transferred by holding it along the established reference axis during an interval of time just prior to and while passing through a point of tangency of the curves of the operating paths of the feed and operating circuits.

Another object of this invention is to provide an apparatus for the handling of pears for preparation for canning which includes a feed turret and a preparation turret in which an operation of preparing the pear for canning is performed, both of which turrets are of the continuously rotating type and wherein means are provided for transferring the pear from the feed to the operating turret just prior to, during and following the instant of tangency of travel of the pear around the said turrets and wherein the transfer is effected by the gripping of the pear along a reference axis extending longitudinally of the pear.

Other objects and advantages of this invention it is believed will be apparent from the following detailed description of a preferred embodiment thereof as the same is diagrammatically illustrated in the accompanying drawings.

In the drawings:

Figure 1 is a diagrammatic flow sheet illustrating the method and apparatus embodying my invention.

Figure 2 is a diagrammatic plan view illustrating the method embodying my invention.

Figure 3 is a side elevation diagrammatically illustrating the method and apparatus of my invention.

Figure 4 is a fragmental sectional plan view of one of the feed heads embodied in my invention.

Figure 5 is a sectional elevation taken substantially on the line 5—5 of Figure 4 illustrating the feed head in position of receiving a pear.

Figure 6 is a fragmental sectional elevation of a portion of the feed ring actuating means embodied in my invention.

Figure 7 is a sectional plan view taken substantially on the line 7—7 of Figure 5, illustrating the clamp mechanism embodying my invention.

Figure 8 is a sectional plan view taken substantially on the line 8—8 of Figure 5 illustrating the clamp raising and locking mechanisms embodying my invention.

Figure 9 is a sectional view taken substantially on the line 9—9 of Figure 7.

Figure 10 is a sectional view taken substantially on the line 10—10 of Figure 7.

Figure 11 is a diagrammatic plan illustrating the horizontal travel of a pear holding means during the interval of feed and transfer.

Figure 12 is a plan view diagrammatic in character illustrating diagrammatically the means provided for controlling the vertical position of the pear holding ring during the interval of feed.

Figure 13:
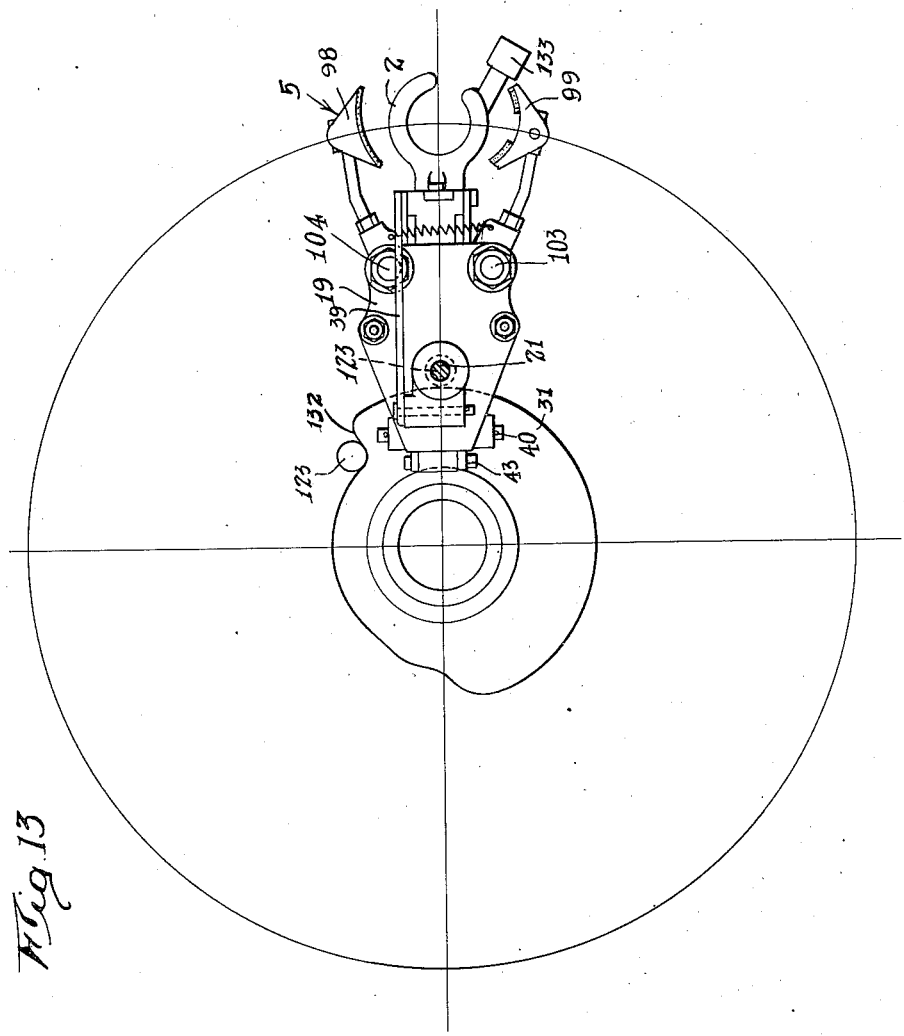
Figure 13 is a view similar to Figure 12 illustrating diagrammatically the clamp control mechanism embodied in my invention.

The pear preparation machine of my invention as the same is illustrated in the accompanying drawing is of the continuous type and involves the utilization of many of the operating mechanisms of my copending application entitled "Method of and apparatus for preparing pears for canning," filed October 5, 1942, Serial No. 460,812.

As a specific means which may be utilized for carrying out the operations of peeling, coring, stemming and splitting pears may be of the same, or substantially the same, construction as illustrated in my said copending application, I have not herein specifically illustrated said mechanisms.

The method and apparatus of my present invention deals primarily with the feed mechanism and transfer of the pears to the operating or peeling turret as illustrated in my said copending application.

As the method and apparatus of my invention is diagrammatically illustrated in Figure 1, a pear 1, which has usually been graded to diameter, is fed to a holder or ring 2. The ring 2 is of such diameter as related to such graded pears as to permit the stem end of the pear to pass below the ring a predetermined distance, permitting the trimming and removal of a portion of the stem end a definite distance below the ring 2. The pear is fed into the ring 2 with its calyx in line with a center 3 and is held in this position until the pear is raised to pass the calyx over a point of the center 3. These operations establish a reference axis through the pear which corresponds substantially with the stem of the pear. With the pear thus positioned, it is gripped by means of suitable clamps 4 and 5 on the butt of the pear, and then the center 3 is removed from engaging position to permit cutting away of the calyx end of the pear to form a reference plane transverse to the reference axis. With the pear thus gripped by the clamps 4 and 5, it is passed through an operation of trimming by means of cutting discs 6 and 7 at both the stem and calyx ends of the pear.

The cutting disc 7 is definitely related to the ring 2 so that the cutting disc 7 always cuts the stem end of the pear a definite distance below the ring 2, thus as the ring 2 is positioned due to the varying length of pears, means are provided, as will hereinafter be described, to position the cutting disc 7 with relation to the established position of the ring 2.

The foregoing operations are performed in accordance with my invention in the feed turret and are performed to condition the pear both as to position and as to the formation of reference points of operation for receipt in an operating turret in which subsequent operations of peeling, stemming, coring and halving may be performed. The pear has been positioned on a reference axis corresponding with the stem axis through the pear. The operation of transferring the pear to the operating turret is now performed as the feed and operating turrets are continuously operating.

The operation of transfer in accordance with my invention is carried out by impaling the pear in the operating turret along the reference axis by means of a stemming tube 8 and an impaling blade 9 which are actuated to impale the pear along this established reference axis, preferably from opposite ends of the pear so that the reference plane established at the calyx end of the pear is positioned against a stop 10.

As will be evident from Figures 2 and 11, transfer is carried out through an arc of travel of the pear where the clamps 4 and 5 and ring 2 are traveling at the same peripheral speed, as are the stemming tube 8 and impaling blade 9 and where these arcs of travel are, at one point during the transfer, tangent to each other. In effecting this transfer in accordance with my invention, I have found that the stemming tube 8 and impaling blade 9 may be moved into the flesh of the pear substantially along the reference axis at a position of their travel in advance of the point of tangency so that the stemming tube 8 and impaling blade 9 are fed along the reference axis and into the flesh of the pear as the pear passes through the point of tangency and beyond this point a distance substantially equal to the distance in advance of tangency where the impaling started. As an example of this, I have found that where the feed turret and preparation turrets A and B are of approximately 10 inches radius and are positioned so that their point of tangency lies in the center line C, that the arc of travel during which transfer is being effected as hereinabove described may be through an arc of 8 to 10°, with the result that the stemming tube 8 is of a maximum of $\frac{3}{32}$ of an inch out of accurate alignment with the center of the ring 2. This is within the limit of accuracy of the centering of the pear in the ring 2 to establish the reference axis along the stem core of a pear where such stem core extends from the calyx of the pear through the pear neck.

As a pear is not a rigid structure, it will therefore permit the stemming tube 8 and impaling blade 9 to be fed along the reference axis without distorting the position of the stemming tube or impaling blade or the reference axis established through the pear during the transfer of the pear into the operating turret.

In the specific modification of my invention set forth in the drawings, I have indicated the circles of operation of the turrets as being brought together at a point lying on the line passing through the center of the turret and in the specific example given above, I have shown where this will cause a misalignment of a maximum not to exceed $\frac{3}{32}$ of an inch during the arc selected for transfer. My invention, however, also contemplates the crossing of the circles of operation of the turrets, and in this way I would reduce the degree of misalignment up to one-half the misalignment caused by bringing the curves to a point of meeting on the line passing through the centers.

As illustrated in Figure 1, this period of transfer may be from 4° in advance of the center line C to 4° beyond the center line C. However, this tofore set forth until after the ring 2 has raised another pear up until the center 3 passes into the pear calyx when the slide formed of the plates 120 and 121 moves toward the center of rotation of the turret, which action moves the pin 127 back through the slots 128 permitting the spring 100 to close the clamps 4 and 5 upon the butt of the pear. As the slide continues to move back, it carries the pin 127, together with the link 125, back to their limit position, thereby allowing the spring 112 to again thrust the lock wedge 111 between the lock surfaces 109 and 110.

The raising and lowering cam 47 is formed so that the cam groove 46 has a locking pressure angle against the roller 45 such that the ring 2 will be locked in its position determined by the length of the pear.

In Figure 13 I have illustrated the formation of the cam surface of the cam ring 31 wherein I have illustrated the relief 132 formed on this surface into which the cam roller 123 drops to effect a sharp closing of the clamps 4 and 5 under the influence of the spring 100.

As set forth in my copending application above referred to, the ring 2 carries a roller 133 which engages a bar 134 carried by the stem and cutting disc 135 to move this cutting disc down a predetermined distance below the ring 2 whereby the neck of the pear is always cut a predetermined distance below the ring. The particular mechanism utilized for effecting this movement of the cutting disc 135 is set forth in my copending application hereinabove referred to.

I have herein illustrated diagrammatically in Figure 2 a means for actuating the stemming tube 8 and the impaling blade 9 so that the said members are moved to impale the pear and are then moved together to raise the pear out of the ring 2 so that the stemming tube 8 may then progress through the opening 11 formed in the ring. This means may be as illustrated in my copending application above referred to and generally includes a pair of cams indicated at 136 and 137 against which cam rollers 138 and 139 are held so that as the operating turret A revolves, carrying with it the stemming tube 8 and impaling blade 9, they are moved toward each other to impale the pear upon its predetermined axis after which the stemming tube 8 and impaling blade 9 move upwardly together to lift the pear out of the ring 2.

Having fully described my invention, it is to be understood that I do not wish to be limited to the details herein set forth, but my invention is of the full scope of the appended claims.

I claim:

1. In a pear preparation machine, a feed turret including a feed ring, a center, the feed ring being adapted to receive the neck of the pear, means for actuating the center to position the same in the line of the stem axis of the pear, means for actuating the ring to move the pear so held so that the center passes into the calyx of the pear, the ring actuating means including spring means which yieldably urge the pear toward the center, and means for relieving the spring pressure when the center is positioned in the pear calyx.

2. In a pear preparation machine, the combination of a feed head including a ring adapted to receive the neck of a pear, means for actuating the ring to move the pear, a center, means for actuating the center to move the same into the calyx of the pear to arrest movement of the pear, whereby the position of the ring is determined with reference to the length of the pear, means for gripping the butt end of the pear so positioned, said gripping means including a pair of clamp members, means for yieldably urging the clamp members into pear-engaging position, means for locking the clamp members against movement away from said clamping position, and means for actuating said gripping means including a cam, a cam roller adapted to engage said cam, means operatively connected with the cam roller adapted to release the locking means and to then actuate the said clamps to open position, the cam having an abrupt relief on its surface whereby the cam roller in passing into said relief operates to permit an abrupt closing of the clamp under the influence of said yielding means.

3. In a pear preparation machine, a feed turret having a feed head comprising a feed ring adapted to receive the neck of a pear, a center, adapted to engage an end of a pear supported in the ring, a clamp means adapted to engage the pear on its exterior, means for raising the feed ring to elevate the pear to position to be engaged by the center, said means including a slip drive adapted to yield the pear located with reference to the center whereby the position of the ring is determined in accordance with the length of the pear, means for actuating the clamp means after the position of the ring has been determined whereby the clamp means are permitted to grip the pear on its exterior in the position determined between the ring and the center, said clamp means including a lock for holding the clamp means for movement away from the pear, said clamp actuating means including means for moving the lock from locking position prior to their operation for actuating the clamp means from pear engaging position.

4. In a pear preparation machine, the combination of a pair of clamp members adapted to engage the exterior of a pear, means for yieldably urging the clamp members together, a lock for holding the clamp in closed position, said lock including a pair of lock plates, one of which is operatively connected with each clamp member and which lock plates have curved lock faces, a locking wedge, means for yieldably thrusting the locking wedge into position between the curved lock faces, a cam, a cam roller, means for yieldably maintaining the cam roller against the cam, the cam roller being supported by a lock plate, means operatively connecting the wedge with the lock plate, means operatively connecting the clamp members with the lock plate whereby movement of the lock plate under influence of the cam operates to move the lock wedge from locking position and to then actuate the clamp members to open position.

5. In a pear preparation machine, a feed head including a feed ring adapted to receive the neck of a pear, means for continuously moving the feed ring and means operative during the movement of the feed ring to produce an effective pause of the ring at a feeding position, said means including a cam, a roller operatively associated with the cam, a gear segment actuated by the cam roller, means for pivotally supporting the feed ring, a gear segment adapted to mesh with the first gear segment and operatively connected with the ring support whereby advancement of the feed ring is accelerated to a feed position and retained substantially at said feed position during an arc of travel of the feed ring rotating means.

6. In a method of peeling pears, the steps of positioning a pear with its stem fibre axis in a definite centered line, moving the pear in a curved path normal to said axis, moving an impaling member with its longitudinal axis parallel to the stem axis of the pear about a second curved path, the two curved paths being arranged to intersect at a point, the pear and the impaling members moving about their curved paths in timed relation to a position of alignment of the stem axis of the pear and the longitudinal axis of the impaling member as the said pear and impaling member moves through the point of intersection, moving the impaling member in the direction of its longitudinal axis while the pear and impaling member are moving through the point of intersection and after the pear and impaling member have moved away from the point of intersection, and while the pear and impaling member are moving in their relative curved paths and are out of position of alignment of the impaling member with the aforestated definite center line.

7. In a method of peeling pears, the steps of positioning a pear with its stem fibre axis in a definite centered line, moving the pear in a curved path normal to said axis, moving an impaling member with its longitudinal axis parallel to the stem axis of the pear about a second curved path, the two curved paths being arranged to intersect at a point, the pear and the impaling members moving about their curved paths in timed relation to a position of alignment of the stem axis of the pear and the longitudinal axis of the impaling member as the said pear and impaling member moves through the point of intersection, and moving the impaling member in the direction of its longitudinal axis to impale the pear while the impaling member and pear are moving toward and away from the point of intersection and the movement of the impaling member into the pear being continued during movement through the point of intersection of the paths.

8. In an apparatus for preparing fruit for canning, the combination of a continuously moving feed means, holding means on the feed means for receiving and centering a fruit with its stem axis in a definite centered line, said feed means moving in a curved path normal to said axis, a continuously moving operating means, an impaling means carried by the operating means with its longitudinal axis parallel to the stem axis of the fruit, means for driving the operating means to move the impaling means in a second curved path, the paths of the stem axis of the fruit as supported in the feed means and axis of the impaling means as supported in the operating means meeting at a point, means for driving the feed means and operating means in timed relation, actuating means in the operating means for moving the impaling means in the direction of its longitudinal axis to impale the pear along its stem axis at the point of intersection of the curved paths of movement of the fruit in the feed means and the curved path of movement of the impaling means in the operating means, the impaling means actuating means continuing to actuate the impaling means to impale the pear after the fruit and impaling means have passed through the point of intersection of said curved paths.

9. In an apparatus for preparing fruit for canning, the combination of a continuously moving feed means, holding means on the feed means for receiving and centering a fruit with its stem axis in a definite centered line, said feed means moving in a curved path normal to said axis, a continuously moving operating means, an impaling means carried by the operating means with its longitudinal axis parallel to the stem axis of the fruit, means for driving the operating means to move the impaling means in a second curved path, the paths of the stem axis of the fruit as supported in the feed means and axis of the impaling means as supported in the operating means meeting at a point, means for driving the feed means and operating means in timed relation, actuating means in the operating means for moving the impaling means in the direction of its longitudinal axis to impale the pear along its stem axis at the point of intersection of the curved paths of movement of the fruit in the feed means and the curved path of movement of the impaling means in the operating means, the impaling means actuating means operating to move the impaling means to impale the fruit as the fruit and impaling means approach and before reaching the point of intersection, and the movement of the impaling means into the pear being continued during movement through the point of intersection of the paths.

10. In an apparatus for preparing fruit for canning, the combination of a continuously moving feed means, holding means on the feed means for receiving and centering a fruit with its stem axis in a definite centered line, said feed means moving in a curved path normal to said axis, a continuously moving operating means, an impaling means carried by the operating means with its longitudinal axis parallel to the stem axis of the fruit, means for driving the operating means to move the impaling means in a second curved path, the paths of the stem axis of the fruit as supported in the feed means and axis of the impaling means as supported in the operating means meeting at a point, means for driving the feed means and operating means in timed relation, actuating means in the operating means for moving the impaling means in the direction of its longitudinal axis to impale the pear along its stem axis at the point of intersection of the curved paths of movement of the fruit in the feed means and the curved path of movement of the impaling means in the operating means, the impaling means actuating means operating to move the impaling means to impale the fruit as the fruit and impaling means approach and before reaching the point of intersection, the movement of the impaling means into the pear being continued during movement through the point of intersection of the paths, and means for actuating the holding means in the feed means to release the fruit to the impaling means when the fruit has been impaled by the impaling means.

GUY A. DUNN.

REFERENCES CITED

The following references are of record in the file of this patent:

UNITED STATES PATENTS

| Number | Name | Date |
| --- | --- | --- |
| 1,876,000 | Goranson et al. | Sept. 6, 1932 |
| 2,179,529 | Thompson | Nov. 14, 1939 |
| 2,335,620 | Thompson | Nov. 30, 1943 | tofore set forth until after the ring 2 has raised another pear up until the center 3 passes into the pear calyx when the slide formed of the plates 120 and 121 moves toward the center of rotation of the turret, which action moves the pin 127 back through the slots 128 permitting the spring 100 to close the clamps 4 and 5 upon the butt of the pear. As the slide continues to move back, it carries the pin 127, together with the link 125, back to their limit position, thereby allowing the spring 112 to again thrust the lock wedge 111 between the lock surfaces 109 and 110.

The raising and lowering cam 47 is formed so that the cam groove 46 has a locking pressure angle against the roller 45 such that the ring 2 will be locked in its position determined by the length of the pear.

In Figure 13 I have illustrated the formation of the cam surface of the cam ring 31 wherein I have illustrated the relief 132 formed on this surface into which the cam roller 123 drops to effect a sharp closing of the clamps 4 and 5 under the influence of the spring 100.

As set forth in my copending application above referred to, the ring 2 carries a roller 133 which engages a bar 134 carried by the stem and cutting disc 135 to move this cutting disc down a predetermined distance below the ring 2 whereby the neck of the pear is always cut a predetermined distance below the ring. The particular mechanism utilized for effecting this movement of the cutting disc 135 is set forth in my copending application hereinabove referred to.

I have herein illustrated diagrammatically in Figure 2 a means for actuating the stemming tube 8 and the impaling blade 9 so that the said members are moved to impale the pear and are then moved together to raise the pear out of the ring 2 so that the stemming tube 8 may then progress through the opening 11 formed in the ring. This means may be as illustrated in my copending application above referred to and generally includes a pair of cams indicated at 136 and 137 against which cam rollers 138 and 139 are held so that as the operating turret A revolves, carrying with it the stemming tube 8 and impaling blade 9, they are moved toward each other to impale the pear upon its predetermined axis after which the stemming tube 8 and impaling blade 9 move upwardly together to lift the pear out of the ring 2.

Having fully described my invention, it is to be understood that I do not wish to be limited to the details herein set forth, but my invention is of the full scope of the appended claims.

I claim:

1. In a pear preparation machine, a feed turret including a feed ring, a center, the feed ring being adapted to receive the neck of the pear, means for actuating the center to position the same in the line of the stem axis of the pear, means for actuating the ring to move the pear so held so that the center passes into the calyx of the pear, the ring actuating means including spring means which yieldably urge the pear toward the center, and means for relieving the spring pressure when the center is positioned in the pear calyx.

2. In a pear preparation machine, the combination of a feed head including a ring adapted to receive the neck of a pear, means for actuating the ring to move the pear, a center, means for actuating the center to move the same into the calyx of the pear to arrest movement of the pear, whereby the position of the ring is determined with reference to the length of the pear, means for gripping the butt end of the pear so positioned, said gripping means including a pair of clamp members, means for yieldably urging the clamp members into pear-engaging position, means for locking the clamp members against movement away from said clamping position, and means for actuating said gripping means including a cam, a cam roller adapted to engage said cam, means operatively connected with the cam roller adapted to release the locking means and to then actuate the said clamps to open position, the cam having an abrupt relief on its surface whereby the cam roller in passing into said relief operates to permit an abrupt closing of the clamp under the influence of said yielding means.

3. In a pear preparation machine, a feed turret having a feed head comprising a feed ring adapted to receive the neck of a pear, a center, adapted to engage an end of a pear supported in the ring, a clamp means adapted to engage the pear on its exterior, means for raising the feed ring to elevate the pear to position to be engaged by the center, said means including a slip drive adapted to yield the pear located with reference to the center whereby the position of the ring is determined in accordance with the length of the pear, means for actuating the clamp means after the position of the ring has been determined whereby the clamp means are permitted to grip the pear on its exterior in the position determined between the ring and the center, said clamp means including a lock for holding the clamp means from movement away from the pear, said clamp actuating means including means for moving the lock from locking position prior to their operation for actuating the clamp means from pear engaging position.

4. In a pear preparation machine, the combination of a pair of clamp members adapted to engage the exterior of a pear, means for yieldably urging the clamp members together, a lock for holding the clamp in closed position, said lock including a pair of lock plates, one of which is operatively connected with each clamp member and which lock plates have curved lock faces, a locking wedge, means for yieldably thrusting the locking wedge into position between the curved lock faces, a cam, a cam roller, means for yieldably maintaining the cam roller against the cam, the cam roller being supported by a lock plate, means operatively connecting the wedge with the lock plate, means operatively connecting the clamp members with the lock plate whereby movement of the lock plate under influence of the cam operates to move the lock wedge from locking position and to then actuate the clamp members to open position.

5. In a pear preparation machine, a feed head including a feed ring adapted to receive the neck of a pear, means for continuously moving the feed ring and means operative during the movement of the feed ring to produce an effective pause of the ring at a feeding position, said means including a cam, a roller operatively associated with the cam, a gear segment actuated by the cam roller, means for pivotally supporting the feed ring, a gear segment adapted to mesh with the first gear segment and operatively connected with the ring support whereby advancement of the feed ring is accelerated to a feed position and retained substantially at said feed position during an arc of travel of the feed ring rotating means.

6. In a method of peeling pears, the steps of positioning a pear with its stem fibre axis in a definite centered line, moving the pear in a curved path normal to said axis, moving an impaling member with its longitudinal axis parallel to the stem axis of the pear about a second curved path, the two curved paths being arranged to intersect at a point, the pear and the impaling members moving about their curved paths in timed relation to a position of alignment of the stem axis of the pear and the longitudinal axis of the impaling member as the said pear and impaling member moves through the point of intersection, moving the impaling member in the direction of its longitudinal axis while the pear and impaling member are moving through the point of intersection and after the pear and impaling member have moved away from the point of intersection, and while the pear and impaling member are moving in their relative curved paths and are out of position of alignment of the impaling member with the aforestated definite center line.

7. In a method of peeling pears, the steps of positioning a pear with its stem fibre axis in a definite centered line, moving the pear in a curved path normal to said axis, moving an impaling member with its longitudinal axis parallel to the stem axis of the pear about a second curved path, the two curved paths being arranged to intersect at a point, the pear and the impaling members moving about their curved paths in timed relation to a position of alignment of the stem axis of the pear and the longitudinal axis of the impaling member as the said pear and impaling member moves through the point of intersection, and moving the impaling member in the direction of its longitudinal axis to impale the pear while the impaling member and pear are moving toward and away from the point of intersection and the movement of the impaling member into the pear being continued during movement through the point of intersection of the paths.

8. In an apparatus for preparing fruit for canning, the combination of a continuously moving feed means, holding means on the feed means for receiving and centering a fruit with its stem axis in a definite centered line, said feed means moving in a curved path normal to said axis, a continuously moving operating means, an impaling means carried by the operating means with its longitudinal axis parallel to the stem axis of the fruit, means for driving the operating means to move the impaling means in a second curved path, the paths of the stem axis of the fruit as supported in the feed means and axis of the impaling means as supported in the operating means meeting at a point, means for driving the feed means and operating means in timed relation, actuating means in the operating means for moving the impaling means in the direction of its longitudinal axis to impale the pear along its stem axis at the point of intersection of the curved paths of movement of the fruit in the feed means and the curved path of movement of the impaling means in the operating means, the impaling means actuating means continuing to actuate the impaling means to impale the pear after the fruit and impaling means have passed through the point of intersection of said curved paths.

9. In an apparatus for preparing fruit for canning, the combination of a continuously moving feed means, holding means on the feed means for receiving and centering a fruit with its stem axis in a definite centered line, said feed means moving in a curved path normal to said axis, a continuously moving operating means, an impaling means carried by the operating means with its longitudinal axis parallel to the stem axis of the fruit, means for driving the operating means to move the impaling means in a second curved path, the paths of the stem axis of the fruit as supported in the feed means and axis of the impaling means as supported in the operating means meeting at a point, means for driving the feed means and operating means in timed relation, actuating means in the operating means for moving the impaling means in the direction of its longitudinal axis to impale the pear along its stem axis at the point of intersection of the curved paths of movement of the fruit in the feed means and the curved path of movement of the impaling means in the operating means, the impaling means actuating means operating to move the impaling means to impale the fruit as the fruit and impaling means approach and before reaching the point of intersection, and the movement of the impaling means into the pear being continued during movement through the point of intersection of the paths.

10. In an apparatus for preparing fruit for canning, the combination of a continuously moving feed means, holding means on the feed means for receiving and centering a fruit with its stem axis in a definite centered line, said feed means moving in a curved path normal to said axis, a continuously moving operating means, an impaling means carried by the operating means with its longitudinal axis parallel to the stem axis of the fruit, means for driving the operating means to move the impaling means in a second curved path, the paths of the stem axis of the fruit as supported in the feed means and axis of the impaling means as supported in the operating means meeting at a point, means for driving the feed means and operating means in timed relation, actuating means in the operating means for moving the impaling means in the direction of its longitudinal axis to impale the pear along its stem axis at the point of intersection of the curved paths of movement of the fruit in the feed means and the curved path of movement of the impaling means in the operating means, the impaling means actuating means operating to move the impaling means to impale the fruit as the fruit and impaling means approach and before reaching the point of intersection, the movement of the impaling means into the pear being continued during movement through the point of intersection of the paths, and means for actuating the holding means in the feed means to release the fruit to the impaling means when the fruit has been impaled by the impaling means.

GUY A. DUNN.

REFERENCES CITED

The following references are of record in the file of this patent:

UNITED STATES PATENTS

| Number | Name | Date |
|---|---|---|
| 1,876,000 | Goranson et al. | Sept. 6, 1932 |
| 2,179,529 | Thompson | Nov. 14, 1939 |
| 2,335,620 | Thompson | Nov. 30, 1943 |